United States Patent Office 3,745,214
Patented July 10, 1973

3,745,214
METHOD FOR THE TREATMENT OF ACUTE OR CHRONIC DIARRHEA
André Queuille, Noisy-le-Sec, and Raymond Larde, Coubron, France, assignors to Roussel-UCLAF, Paris, France
No Drawing. Continuation-in-part of application Ser. No. 116,675, Feb. 18, 1971, which is a continuation of application Ser. No. 663,979, Aug. 29, 1967, both now abandoned. This application Feb. 19, 1971, Ser. No. 117,066
Claims priority, application France, Aug. 31, 1966, 74,796
Int. Cl. A61k 27/00
U.S. Cl. 424—78
6 Claims

ABSTRACT OF THE DISCLOSURE

The present invention relates to a pharmaceutical composition for the control of acute or chronic diarrhea which comprises a minor amount of a pulverulent, pharmaceutical-grade polyamide selected from the group consisting of nylon 6, nylon 66, nylon 610, nylon 11 and copolymers of nylon 66 and nylon 12 and a major amount of a pharmaceutical medium. The pharmaceutical composition is utilized for controlling diarrhea by orally administering the composition containing a therapeutically effective amount of the active principle to a subject suffering from diarrhea.

REFERENCE TO PRIOR APPLICATIONS

This application is a continuation-in-part of our copending U.S. Patent application Ser. No. 116,675, filed Feb. 18, 1971, now abandoned, which application was a continuation of U.S. Patent application Ser. No. 663,979, filed Aug. 29, 1967, now abandoned.

OBJECTS OF THE INVENTION

An object of the present invention is the development of a pharmaceutical composition for the control of acute or chronic diarrhea which comprises a minor amount of a pulverulent, pharmaceutical-grade polyamide selected from the group consisting of nylon 6, nylon 66, nylon 610, nylon 11 and copolymers of nylon 66 and nylon 12 and a major amount of a pharmaceutical medium.

Another object of the present invention is the development of a method for controlling acute or chronic diarrhea which comprises orally administering to a subject suffering from diarrhea a therapeutically effective amount of a pulverulent, pharmaceutical-grade polyamide selected from the group consisting of nylon 6, nylon 66, nylon 610, nylon 11 and copolymers of nylon 66 and nylon 12.

These and other objects of the invention will become more apparent as the description thereof proceeds.

DESCRIPTION OF THE INVENTION

More particularly, the invention relates to pharmaceutical compounds for the treatment of acute or chronic diarrhea containing as active principle, either alone or combined with other active principles, a pulverulent, pharmaceutical-grade polyamide preferably having an average molecular weight of between 10,000 and 50,000 selected from the group consisting of poly-ε-caproamide (nylon 6), polyhexamethyleneadipamide (nylon 66), polyhexamethylenesebacamide (nylon 610), polyundecanoic acidamide (nylon 11) and terpolymers of hexamethylenediamine, adipic acid and 12-aminododecanoic acid (copolymer of nylon 66 and nylon 12). The pulverulent, pharmaceutical-grade polyamides are commercially available from a variety of manufacturers under a variety of trade names.

Among the polyamides, poly-ε-caproamide or nylon 6, a polycondensation of caprolactam having a molecular weight of about 10,000 to 20,000 is preferable. Poly-ε-caproamide, commercialized under the registered trade name "Divergan SZ 9010" occurs in the form of a tasteless and odorless white powder, insoluble in water, of pharmaceutical-grade having an average molecular weight of about 10,000 to 20,000.

Apparent density: 0.3 kg./liter
Water content: 10% maximum
Impurities extractable with alcohol: 0.1% maximum.

Other poly-ε-caproamides comparable to the above are commercially available under the registered trade names, "Ultramid" K228 BMZ (BASF), "Perlon" (BASF), etc.

Polyhexamethyleneadipamide of pharmaceutical grade having an average molecular weight of about 10,000 to 50,000 is commercially available under the commercial name nylon 66 as well as registered trade names such as "Ultramid A4K" (BASF). Polyhexametheneadipamide or nylon 66 is a condensation product of hexamethylenediamine and adipic acid in substantially equimolar amounts.

Polyhexamethylenesebacamide or nylon 610 of a pulverulent pharmaceutical-grade having an average molecular weight of about 15,000 to 50,000 is commercially available under the registered trade names such as "Ultramid S3K" (BASF) or under the commercial name nylon 610. This is a condensation product of hexamethylenediamine and sebacic acid in substantially equimolar amounts.

Poly-ε-undecanoic acid amide or nylon 11 of a pulverulent pharmaceutical-grade having an average molecular weight of about 15,000 to 30,000 is commercially available under the registered trade name "Rilsan" or under the commercial name nylon 11. This is a polycondensation product of 11-aminoundecanoic acid or the corresponding lactam.

The terpolymer of hexamethylenediamine, adipic acid and 12-aminododecanoic acid or the copolymer of nylon 66 and nylon 12 of a pulverulent pharmaceutical-grade having an average molecular weight of about 10,000 to 50,000 is commercially available under the registered trade name "Grill-tex IF." This is a condensation product of about 1 mol of hexamethylenediamine, 1 mol of adipic acid and 0.5 to 2 mols of 12-aminododecanoic acid.

As it has been mentioned above, the active principle of these new pharmaceutical compositions, object of the invention, can be incorporated in the composition, either alone or in combination with other active principles such as local antibiotics, for example, framycetin sulfate, paromomycin sulfate, kanamycin sulfate, gentamycin sulfate, neomycin sulfate, or the intestinal antiseptics, such as 5-chloro-7-iodo-8-oxyquinoline, benzonaphthol, sulfanilamido-thiazol-formaldehyde, hexamethylenetetramine, etc.

The new pharmaceutical compositions, object of the invention are endowed with interesting pharmacological properties and in particular, they possess an important anti-diarrhetic action.

They can be utilized for the treatment of acute or chronic diarrhea, caused by infections such as alimentary poisoning, change of diet or too frequent use of laxatives, or by disturbances of extra-intestinal orgin and particularly, by diarrhea resulting from treatments with antibiotics.

The use of the anti-diarrhetic compositions of the invention does not entail any secondary disturbances, such as constipation, a phenomenon commonly observed with many anti-diarrhetic products. Moreover, these new compositions have the advantage of being practically atoxic.

These new compositions are administered orally. They can be prepared in the form of tablets, capsules, aromatic powders, suspensions, sachets and aromatized granules.

The useful dosology is controlled between 10 mg./kg. and 100 mg./kg. of the active principle per day, orally, in the warm-blooded animal. Specifically, daily doses of from 2 gm. to 6 gm. are recommended for the human therapy. This dosage can be divided into several administrations and the customary dose for the adult contains 2 gm. of the active principle.

The following specific examples are illustrative of the practice of the invention. They are not, however, to be deemed limitative in any manner.

The pharmaceutical forms, such as tablets, capsules, aromatized powders, suspensions, sachets and aromatized granules, are prepared according to the usual processes.

EXAMPLE I

Examples for the preparation of the various pharmaceutical forms (1) Preparation of aromatized granules in sachet doses

| | Grams |
|---|---|
| Poly-$\epsilon$-caproamide having a molecular weight of about 10,000 to 20,000 ("Divergan SZ 9010") | 2 |
| Citric acid | 0.10 |
| "Pluronic F 68" [1] | 0.015 |
| Sodium cyclohexylsulfamate | 0.012 |
| Sodium saccharinate | 0.006 |
| Solid perfumes, liquid perfumes | 0.07 |
| Semolina sugar [1] in a sufficient quantity for | 10 |

[1] "Pluronic F 68" is the trade name for a condensation product of ethylene oxide and proylene glycol having a molecular weight between 1,500 and 8,000. Semolina sugar is a finely powdered sugar comparable in sizing to semolina.

The polyamide, citric acid, "Pluronic F 68," the synthetic sweetening agents, the pulverulent fraction of the perfumes and the sugar were combined in a dry mixture. The liquid fraction of the perfumes was placed in solution in 80% ethanol, and this solution was sprayed over the powdery mixture. The mixture was dried in an oven, passed through a sifter and prepared in sachet doses of 10 gm.

(2) Preparation of complex granules in sachet doses

| | Grams |
|---|---|
| Poly-$\epsilon$-caproamide having a molecular weight of about 10,000 to 20,000 | 2 |
| Pyridoxal hydrochloride | 0.50 |
| Biotin | 0.002 |
| Citric acid | 0.10 |
| "Pluronic F 68" | 0.015 |
| Sodium cyclohexylsulfamate | 0.012 |
| Sodium saccharinate | 0.006 |
| Solid perfumes, liquid perfumes | 0.07 |
| Semolina sugar in a sufficient quantity for | 10 |

The preparation of the complex granules was identical to that described for the preparation of the simple granules of the preceding.

(3) Preparation of aromatized sachets (5 gm.)

| | Grams |
|---|---|
| Poly-$\epsilon$-caproamide having a molecular weight of about 10,000 to 20,000 | 3 |
| Polvaromas Ananas | 0.020 |
| Polvaromas Vanilla | 0.100 |
| "Avicel R.C." (microcrystalline cellulose, U.S. Pat. 2,978,446) | 0.150 |
| Semolina sugar | 1.730 |

Polvaromas Ananas and Polvaromas Vanilla are the trade name of solid aromatic concentrates of pineapple (ananas) and vanilla sold by International Flavour and Fragrances (I.F.F.).

The preparation was effected by admixing the ingredients to obtain an aromatized powder in sachet doses.

(4) Preparation of granules (in combination with an antibiotic)

| | Grams |
|---|---|
| Poly-$\epsilon$-caproamide having a molecular weight of about 10,000 to 20,000 | 2 |
| Framycetin sulfate | 0.150 |
| Sodium saccharinate | 0.008 |
| "Sucaryl" | 0.014 |
| "Pluronic F 68" | 0.090 |
| Citric acid | 0.100 |
| Solid perfumes | 0.060 |
| Quinoline yellow | 0.003 |
| Semolina sugar in a sufficient quantity for | 5 |

Sucaryl is the trade name of a brand of sodium cyclohexylsulfamate. Quinoline yellow is a mixture of monosulfonic and disulfonic acids of quinophthalone or of quinolylindandione (sodium salts) used as a coloring material for medicines. "Pluronic F 68" is a polyoxyethylene-polyoxypropylene glycol having an approximate molecular weight of 7500.

The preparation of the granules was the same as described above.

(5) Preparation of granules (in combination with an antiseptic)

| | Grams |
|---|---|
| Poly-$\epsilon$-caproamide having a molecular weight of about 10,000 to 20,000 | 2 |
| 5-chloro-7-iodo-8-oxyquinoline | 0.250 |
| Sodium saccharinate | 0.008 |
| "Sucaryl" | 0.014 |
| "Pluronic F68" | 0.090 |
| Citric acid | 0.100 |
| Solid perfumes | 0.060 |
| Quinoline yellow | 0.003 |
| Semolina sugar in a sufficient quantity for 5. | |

The preparation of the granules was identical to that described above.

In each instance, the poly-$\epsilon$-caproamide having a molecular weight of about 10,000 to 20,000 can be substituted by a like amount of the other polyamides listed above such as nylon 66, nylon 610, nylon 11 and the copolymer or nylon 66 and nylon 12. The preparation is the same and the effect is also the same.

EXAMPLE II

Pharmacological study (1) Effect of poly-$\epsilon$-caproamide on the tied intestinal loop of the rabbit, subjected to the action of a pathogenic colibacillus The animals were subjected to a hydrous diet 24 hours prior to the test and kept on this diet for the following 24 hours. After anesthesia induced by an intravenous injection with "Nembutal" (sodium pentobarbital) and subsequent abdonimal incision, an intestinal loop was tied over a length of 10 to 12 cm. Next, 1 cc. of a 16-hour old colibacilli culture (standard Taylor strain E 65156:026:B6 isolated from an infant with gastro-enteritis) in petonized water at a pH of 8.4, was injected into the intestinal loop.

The animals received either 20 mg. of the studied poly-$\epsilon$-caproamide (Divergen SZ 9010), hereinafter referred to by the code H-3569-1 alone, or 20 mg. and 30 mg. of the product and 1 cc. of the pathogenic culture.

The product was added to and suspended in the culture at the time of the injection being administered. The control animals received only 1 cc. of the culture.

The animals were sacrificed 24 hours after the operation. The increase in the volume of the tied loop (V), the presence of fluid in the loop (L) and the inflammatory reaction (R) (a more or less hemorrhagic aspect of the intestine) were determined. The notation was made subjectively from 0 to 4 plusses (+).

The results obtained are summarized in Table I.

TABLE I

| Series | Weight of rabbit in kg. | Positivity of test | Observations | Culture of 1 drop of the content of intestinal loop |
|---|---|---|---|---|
| Controls—Inoculated with 1 cc. of culture. | No. 1, 2.850 | V ++++<br>L ++++<br>R ++++ | Hard abdomen. | +++<br>+++ |
| | No. 2, 2.600 | V ++++<br>L +++<br>R ++++ | Hard abdomen. | +++<br>++ |
| 20 mg. of H-3569-1 plus 1 cc. of culture. | No. 3, 2.960 | V +++<br>L ++<br>R − | Soft abdomen. | +++ |
| | No. 4, 2.840 | V +++<br>L ++<br>R − | Soft abdomen. | +++ |
| 30 mg. of H-3569-1 plus 1 cc. of culture. | No. 5, 2.850 | V ++<br>L ++<br>R − | Soft abdomen. | +++ |
| | No. 6, 2.940 | V ++<br>L ++<br>R − | Soft abdomen. | +++ |
| 20 mg. of H-3569-1.. | No. 7, 2.750 | V −<br>L −<br>R − | Soft and flat abdomen. | − |
| | No. 8, 2.880 | V −<br>L −<br>R − | Soft and flat abdomen. | − |

NOTE.—V=Increase in volume of the intestinal loop. L=Presence of liquid in the intestinal loop. R=Inflammatory reaction.

According to these results, it was noted that in the animals which received the studied product at doses of 20 and 30 mg. and the pathogenic culture, no inflammatory reaction was observed; whereas on the controls, this reaction was considerable. The increase in the volume of the intestinal loop and the quantity of the fluid therein were definitely less than in the controls. The animals which received the product alone showed neither an increase in the volume of the intestinal loop nor any accumulation of fluid nor any inflammatory reaction.

(2) Effect of polyamides of the invention on the tied intestinal loop of rats, subject to the action of a pathogenic microorganism 22 male rats weighing an average of 75 gm. were subjected to a hydrous diet 24 hours prior to the test and kept on this diet for the following 24 hours. After anesthesia with ether and subsequent abdominal incision, an intestinal loop was tied over an average length of 7 cm. Next, 0.5 ml. of an 18-hour old culture of *Staphylococcus aureus* hemolytic enterotoxic E-58 in Oxoid bouillon No. 2 at a pH of 7.3 was injected into the tied intestinal loop.

The animals received 20 mg. of the studied polyamides and 0.5 ml. of the culture. The studied polyamides were added to the culture medium and used after 3 hours of contact. The control animal received only 0.5 ml. of the culture.

The polyamides studied were (1) a poly-ε-caproamide having a molecular weight of from 10,000 to 20,000 (H-3569-1), (2) a polyundecanoic acid amide having an average molecular weight of about 15,000 to 30,000 (Rilsan), hereinafter referred to by the code H-3766, and (3) polyhexamethylenesebacamide having an average molecular weight of about 15,000 to 50,000, hereinafter referred to by the code H-3767.

The animals were sacrificed 24 hours after the operation. The increase in the volume of the tied loop (V), the presence of fluid in the loop (L) and the inflammatory reaction (R) (a more or less hemorrhagic aspect of the intestine were determined. The notation was made subjectively from 0 to 4 plusses (+).

The results are summarized in Table II.

TABLE II

| Rat No. | Series | Mortality within 24 hours | Survivors at the 24th hour | Positivity of test | Peritonitis |
|---|---|---|---|---|---|
| 1 | Controls—No inoculation. | ---------- | 2/2 | V 0<br>L 0<br>R 0 | None. |
| 2 | | ---------- | | V0<br>L0<br>R0 | None. |
| 3 | Controls—0.5 ml. culture. | 8 hr. | 1/5 | V+++<br>L+++<br>R+++ | + |
| 4 | | 9½ hr. | | V++++<br>L++++<br>R++++ | +++ |
| 5 | | 22 hr. | | V++++<br>L++++<br>R+++ | +++ |
| 6 | | 22 hr. | | V+++<br>L++++<br>R++++ | ++ |
| 7 | | ---------- | | V++++<br>L++++<br>R+++ | +++ |
| 8 | H-3569-1 20 mg. plus 0.5 m. culture. | 22 hr. | 3/5 | V++<br>L++<br>R++ | |
| 9 | 3 hrs. contact | 22 hr. | | V++<br>L++<br>R++ | |
| 10 | | ---------- | | V+++<br>L++<br>R+ | |
| 11 | | ---------- | | V++<br>L++<br>R+ | |
| 12 | | ---------- | | V++<br>L++<br>R+ | |
| 13 | H-3766 20 mg. plus 0.5 ml. culture. | ≈15 hr. | 2/5 | V++++<br>L++++<br>R++++ | |
| 14 | 3 hrs. contact | 22 hr. | | V++++<br>L++++<br>R+++ | |
| 15 | | 22 hr. | | V++++<br>L++++<br>R++ | ++ |
| 16 | | ---------- | | V++++<br>L++++<br>R+++ | |
| 17 | | ---------- | | V++++<br>L++++<br>R++++ | |
| 18 | H-3767 20 mg. and 0.5 ml. culture. | 22 hr. | 3/5 | V++++<br>L++++<br>R+++ | +++ |
| 19 | | 22 hr. | | V+++<br>L+++<br>R+++ | +++ |
| 20 | 3 hrs. contact | ---------- | | V++++<br>L++++<br>R+++ | ++++ |
| 21 | | ---------- | | V++++<br>L++++<br>R++++ | ++++ |
| 22 | | ---------- | | V++++<br>L++++<br>R+ | ++++ |

With all the polyamides studied, the mortality over a 24 hour period was lowered from that of the controls. In addition the poly-ε-caproamide had a very good protective effect against the inflammatory reaction.

(3) Effect of the polyamide of the invention on the tied intestinal loop of the rat, subjected to the action of 0.5 ml. of apyrogenic physiological water.

The procedure reported in (2) above was followed except that the polyamide "Grill-tex 1 F" was added to 0.5 ml. of apyrogenic physiological water at the moment of inoculation. No microorganism cultures were employed.

The results were summarized in Table III.

TABLE III

| Rat No. | Posology | Results of test | Mortality During 24 hrs. | Survivants at the 24th hour |
|---|---|---|---|---|
| 1 | "Grill-tex F 1" 10 mg. plus 0.5 ml. physiological water. | V+++ L+++ R+ | | 4/4 |
| 2 | | V+ L+ R— | | |
| 3 | | V— L— R+ | | |
| 4 | | V— L— R— | | |
| 5 | "Grill-tex F 1" 15 mg. plus 0.5 ml. physiological water. | V— L— R— | | 4/4 |
| 6 | | V— L— R+ | | |
| 7 | | V— L— R+ | | |
| 8 | | V— L— R— | | |
| 9 | "Grill-tex F 1" 20 mg. plus 0.5 ml. physiological water. | V— L— R+ | | 4/4 |
| 10 | | V— L— R— | | |
| 11 | | V— L— R++ | | |
| 12 | | V— V— R+ | | |

With exception of rat No. 1, in all cases where a hemorrhagic reaction was noted this reaction corresponded to a reaction of the internal wall of the tied intestine with the production of a heavy liquid, tinged with blood, and substantially localized near the accumulation of the "Grill-tex Fl," i.e., at the ends of the tied loop.

For the three doses used, a certain number of tied intestinal loops which contained liquid tinged with blood were noted. The frequency of these reactions increases with the dose used.

These reactions seem to be due to the fact that there is an agglomeration of the product at certain points and preferably at the ends of the ligated loop where an effect of irritation is produced, but without intestinal perforation.

(4) Effect of poly-ε-caproamide in combination with framycetin sulfate on the tied intestinal loop of the rabbit subjected to the action of a pathogenic colibacillus By conducting the same experiment as described under (1), a very effective synergistic action was observed against the attack of a culture of the E coli pathogenic type 026 B6 on the tied intestinal loop of the rabbit.

(5) Effect of poly-ε-caproamide in combination with framycetin sulfate on the tied intestinal loop of young rats subjected to the action of a culture of hemolytic Staphylococci aureus (enterotoxic strain)

Working according to the method described under (1) the conclusion was arrived at that there exists a synergy of effects of poly-ε-caproamice and of framycetin sulfate, when they are associated, in the protection of the intestinal wall against the attack of the culture of a strain of enterotoxic Staphylococci.

(6) In vitro absorbing activity of the polyamides of the invention compared with common absorbents (A) A poly-ε-caproamide having a molecular weight of about 10,000 to 20,000 ("Divergan SZ 9010"), a nylon 6.

(B) A polyhexamethylenesebacamide having a molecular weight of about 15,000 to 50,000, a nylon 610.

(C) A poly-ε-undecanoic acid amide having an average molecular weight of about 15,000 to 30,000 ("Rilsan"), a nylon 11.

(D) A terpolymer of hexamethylenediamine, adipic acid and 12-aminododecanoic acid having a molecular weight of about 10,000 to 50,000 ("Grill-tex 1F"), a copolymer of nylon 66 and nylon 12.

(E) A polymer of maleic anhydride, a terminally unsaturated olefinic compound, a cross-linking agent, described in U.S. Pat. 3,224,941 ("Malethamer").

(F) A copolymer of methylvinylether and maleic anhydride ("Gantrez 149").

(G) A vegetable charcoal.

(H) An animal charcoal.

"Malethamer" and "Gantrez 149" are comparable to the resins disclosed in U.S. Pats. 3,202,577 and 3,297,664.

The indicators used were Acilit, methylene blue and bromophenol blue.

(1) Effect on Acilit (Merck dye fixed on pH-indicator paper)

Acilit paper strips, 10 cm. long x 0.5 cm. wide, were suspended in 20 cc. of distilled water and after 30 minutes of contact, there was obtained a blue solution which after removal of the paper contained 20 cc. of liquid. Each tube was admixed with 100 mg. of the product to be studied and allowed to stand for 4 hours. "Divergan" formed a blue, clear precipitate and the pH of the solution was 6.5. "Malethamer" formed a very pale precipitate with a viscous appearance and the pH of the light green solution was 3.5. "Gantrez 149" formed a viscous mixture and the pH of the medium was 2.5. Consequently, "Divergan" does not modify the pH and gives rise to a powdery sediment. "Malethamer" lowers the pH and gives rise to a mass which swells up. "Gantrez 149" forms a colloidal solution whose pH is very low. "Divergan" absorbed the dye quite well and much better than "Malethamer" and "Gantrez."

(2) Effect on methylene blue

An aqueous solution of 50 γ/cc. of methylene blue in distilled water at different pH's was used. 200 mg. of the products to be studied were added to 20 cc. of solutions of various pH values. The solution was stirred for 30 minutes, filtered and the color of the filtrates and of the precipitates and the pH value were noted. For each pH value the products studied were classified as to adsorbent value in comparison with vegetable charcoal.

The results were summarized in Tables IV and V.

TABLE IV

| Products | pH | Color of solution |
|---|---|---|
| Control | 4.8 | Blue. |
| "Divergan SZ 9010" | 5.2 | Trace of blue. |
| Vegetable charcoal | 5.2 | Decolorized. |
| "Malethamer" | 4.6 | Do- |
| "Gantrez 149" | 2.5 | Gel formation on the funnel |
| Control | 7 | Blue. |
| "Divergan SZ 9010" | 6 | Trace of green. |
| Vegetable charcoal | 6 | Green. |
| "Malethamer" | 5 | Slightly blue. |
| "Gantrez 149" | 2.5 | Gel formation on the funnel. |
| Control | 8.4 | Blue. |
| "Divergan SZ 9010" | 7.0 | Trace of green. |
| Vegetable charcoal | 7.5 | Green. |
| "Malethamer" | 5 | Slightly blue. |
| "Gantrez 149" | 2.5 | Gel formation on the funne |

TABLE V

Absorbent properties at various pH's of methylene blue solution arranged in decreasing order of absorption Initial pH 4.8                                          Final pH
    Vegetable charcoal, and _____ 5.2
    "Malethamer" _____ 4.5
    "Divergan SZ 9010" _____ 5.2
    "Gantrez 149" gelled solution _____ 2.5

Initial pH 7
    "Divergan SZ 9010" and _____ 6
    "Malethamer" _____ 5
    Vegetable charcoal _____ 6
    "Gantrez 149" gelled solution _____ 2.5

Initial pH 8.4
    "Divergan SZ 9010" _____ 7
    "Malethamer" _____ 5
    Vegetable charcoal _____ 7.5
    "Gantrez 149" viscous mass _____ 2.5

With reference to Methylene Blue, "Divergan SZ 9010" is almost as good an absorbent at a pH of 4.8 as vegetable charcoal and "Malethamer," equal to "Malethamer" and superior to vegetable charcoal at a pH of 7 and superior to the others tested as an absorbent at a pH of 8.4. The pH change with "Divergan SZ 9010" is much less than with "Malethamer" and "Gantrez 149" and almost the same as with vegetable charcoal.

(3) Effect on bromophenol blue

The bromophenol blue was used either as 50 γ/cc. aqueous solution of distilled water at different pH or in Oxoid No. 2 nutrient broth medium at a pH of 7.3. The results are shown in Tables VI and VII. The relative absorption values with reference to vegetable charcoal are shown in Table VIII.

TABLE VI

| Products | Aqueous solution | |
|---|---|---|
| | pH | Color of the solution |
| Control | 4.8 | Violet. |
| "Divergan SZ 9010" | 5.5 | Do. |
| Nylon 610 | 5.0 | Do. |
| "Rilsan" | 5.0 | Do. |
| "Grill-tex 1F" | 5.0 | Do. |
| Vegetable charcoal | 5.5 | Do. |
| "Malethamer" | 4.5 | Dark-yellow. |
| "Gantrez 149" | 2.5 | Formation of a yellow-purple colored gel. |
| Control | 7 | Violet. |
| "Divergan SZ 9010" | 6.5 | Do. |
| Vegetable charcoal | 6.5 | Do. |
| "Malethamer" | 5 | Slightly violet. |
| "Gantrez 149" | 3 | Formation of a green-orange gel. |
| Control | 8.4 | Violet. |
| "Divergan SZ 9010" | 7.5 | Do. |
| Vegetable charcoal | 7.5 | Do. |
| "Malethamer" | 5 | Do. |
| "Gantrez 149" | 2.5 | Formation of a yellow-purple gel. |
| Control | >12 | Violet. |
| "Divergan SZ 9010" | 12 | Do. |
| Vegetable charcoal | 12 | Do. |
| "Malethamer" | (¹) | Formation of a blue-purple gel. |
| "Gantrez 149" | 6.5 | Dark violet, viscous liquid. |

¹ Non-measurable.

TABLE VII

In Oxoid No. 2 medium at PH=7.3

| Products | Ph | Color of the solution |
|---|---|---|
| Control | 7.3 | Violet. |
| "Divergan SZ 9010" | 7 | Slightly violet. |
| Vegetable charcoal | 7.3 | Violet. |
| "Malethamer" | 4.6 | Turns purple in 15 min. |
| "Gantrez 149" | 2.5 | Turns purple immediately with gel formation. |

TABLE VIII

Absorbent properties of bromophenol blue at various pH's arranged in decreasing order of absorption Initial pH 4.8—Aqueous solution                Final pH
    Vegetable charcoal _____ 5.5
    "Divergan SZ 9010" _____ 5.5
    "Rilsan" _____ 5.0
    "Grill-tex 1F" _____ 5.0
    "Malethamer" _____ 4.5
    Nylon 610 _____ 5.0
    "Gantrez 149" _____ 2.5

Initial pH 7—Aqueous solution
    "Malethamer" _____ 5
    "Divergan SZ 9010" _____ 6.5
    Vegetable charcoal _____ 6.5
    "Gantrez 149" _____ 3

Initial pH 8.4—Aqueous solution
    "Divergan SZ 9010" _____ 7.5
    Vegetable charcoal _____ 7.5
    "Malethamer" _____ 5
    "Gantrez 149" _____ 2.5

Initial pH >12—Aqueous solution
    "Divergan SZ 9010" _____ 12
    Vegetable charcoal _____ 12
    "Malethamer" gel _____ Unmeasurable
    "Gantrez 149" _____ 6.5

Initial pH=7.3—Nutrient broth Oxoid No. 2
    "Divergan SZ 9010" _____ 7
    Vegetable charcoal _____ 7.3
    "Malethamer" _____ 4.6
    "Gantrez 149" _____ 2.5

Tables VI, VII and VIII show that "Divergan SZ 9010" and "Rilsan" have an important adsorbing action equal to or better than that of vegetable charcoal and practically no effect on the pH while "Malethamer" and Gantrez 149" noticeably lower the pH.

In Oxoid No. 2 nutrient broth, which is used in in vivo experiments, "Divergan SZ 9010" is the best absorbent and has practically no effect on the pH while "Malethamer" and "Gantrez 149" lower the pH to a noticeable extent.

"Malethamer" and "Divergan SZ 9010" also differ between each other by an important fact: "Divergan SZ 9010" practically absorbs no water (1.5 times its weight) while "Malethamer" absorbs 200 times its weight.

(7) Physio-chemical tests of adsorbent power

Tests for the determination of the adsorbent power of "Divergan SZ 9010" have been conducted according to the test procedures of the 1965 French Pharmacopeia for activated charcoal on the fixation of mercuric chloride and of phenol.

Under the described test conditions the adsorbent power of "Divergan SZ 9010" has proven much inferior to that of the activated charcoal. Especially in the case of phenol the observed adsorption is twenty times less than the norm of the Pharmacopeia for the activated charcoal.

(8) Decrease of the pyrogenic power of different media after treatment with "Divergan SZ 9010"

The tests consists in bringing the pyrogenic medium twenty-four hours in contact with "Divergan SZ 9010", then filtering and performing the pyrogenic test according to the technique of the 1965 French Pharmacopeia, which consists in noticing the eventual increase of the body temperature in the rabbit after injection of the thus obtained solution.

(a) Pyrifer (pyrogenic substances obtained starting from non-pathogenic bacterial strains from the coli group) (Asta, R.F.A.) dilution 1:10+2% and 4% "Divergan SZ 9010"=No clear pyrogenic effect.

(b) Propidon (Specia, France) +2% and 4% "Divergan SZ 9010"=Absence of pyrogenic effect.

(c) Crude potassium heparinate (Roussel Uclaf) 106 units/mg. +2% and 4% "Divergan SZ 9010"=Absence of pyrogenic effect.

(9) Study of the effect of "Divergan SZ 9010" on some gram-positive cocci and gram-negative bacilli strains "Divergan SZ 9010" is incorporated into the cluture medium which is then seeded. The media is incubated for 24 hours at 37° C. in the incubator.

In all cases no action of "Divergen SZ 9010" was observed.

(10) Research on the effect of "Divergan SZ 9010" upon the response of the ligated intestinal loop of the rat 27 male rats were subjected to a semi-lactated diet for 24 hours before the tests and for the duration of the tests.

After anesthesia with ether, an intestinal loop was tied over a length of about 7 cm. 0.5 ml. of a culture of *Candida albicans* (obtained after 18 hours of incubation in a nutrient media) in mixture with the substances studied, was injected into the tied loop.

The mixtures of the substances studied plus culture were made 3 hours before the injection in the case of the poly-ε-caproamide having a molecular weight between 10,000 and 20,000 ("Divergan SZ 9010") and the vegetable charcoal, and one hour before in the case of the animal charcoal. The control animals received only 0.5 ml. of the culture. 24 hours after the injection, the tied segments of the intestines were separated from all the animals. The increase in volume of the tied loop (V), the presence of fluid in the loop (L) and the inflammatory reaction (R) were determined and reported by whole numbers from 0 (absence of a manifestation of the phenomena investigated) to 4. In the same fashion the inflammation of the peritoneum was also determined.

The results obtained are summarized in Table IX.

TABLE IX

| Dosage | Results of tests | Observations |
|---|---|---|
| Controls—0.5 ml. culture. | V 4<br>L 4<br>R 2 | Peritonitis: 3, hard abdomen. |
|  | V 3<br>L 3<br>R 4 | Peritonitis: 3. |
|  | V 3<br>L 3<br>R 4 | Peritonitis: 3, hard abdomen. |
|  | V 1<br>L 1<br>R 1 | Peritonitis: 3. |
|  | V 3<br>L 2<br>R 1 | Peritonitis: 3. |
| 0.5 ml. culture plus 15 mg. Divergan. | V 1<br>L 1<br>R 1 | Peritonitis: 3. |
|  | L 1<br>L 1<br>R 0 | Peritonitis: 2. |
|  | V 1<br>L 1<br>R 0 |  |

TABLE IX—Continued

| Dosage | Results of tests | Observations |
|---|---|---|
| 0.5 ml. culture plus 20 mg. Divergan. | V 1<br>L 1<br>R 1 | Peritonitis: 1. |
|  | V 1<br>L 1<br>R 1 | Peritonitis: 1. |
|  | V between 0 and 1<br>L between 0 and 1<br>R 0 |  |
| 0.5 ml. culture plus 15 mg. animal charcoal. | V 1<br>L 1<br>R 1 | Peritonitis: 3. |
|  | V 3<br>L 3<br>Y 0 | Peritonitis: 3, hard abdomen. |
| 0.5 ml. culture plus 20 mg. animal charcoal. | V 3<br>L 3<br>R 3 | Peritonitis: 2. |
|  | V 2<br>L 2<br>R 0 |  |
| 0.5 ml. culture plus 15 mg. vegetable charcoal. | V 3<br>L 3<br>R 1 | Peritonitis: 3. |
|  | V 4<br>L 4<br>R 1 | Peritonitis: 3. |
| 0.5 ml. culture plus 20 mg. vegetable charcoal | V 2<br>L 2<br>R 2 | Peritonitis: 2. |
|  | V 3<br>L 3<br>R 1 | Peritonitis: 2. |

These tests demonstrate that the effect of the polyamide utilized appears to result from an activity of an anti-inflammatory type and cannot be explained in any fashion solely by a simple property of absorption. In the above tests, the charcoal acts purely by absorption. The results of these tests demonstrate that in the animals treated with the polyamide, the liquid produced by the irritated intestinal wall is much less abundant than in the animals treated by charcoal. This demonstrates that, independently of all consideration of the absorbent properties of the products studied, the polyamide has prevented or diminished the inflammatory reaction of the intestinal wall. Consequently the latter, little or non-inflamed, secretes a much less amount of liquid.

(11) Effect of "Divergan," "Malethamer" and "Gantrez" upon the response of the ligated intestinal loop of the rabbit to the action of a pathogenic staphylococcus The procedure is analogous to that described in 1, above, except that a 18 hours old culture of a pathogenic *staphylococcus aureus* in Oxoid No. 2 nutrient broth is used. The tested compounds are added to the culture and are injected either immediately, or after 1½ hours of contact.

The results are summarized in Tables X and XI.

TABLE X

| Dosage | Results of tests | Observations |
|---|---|---|
| 1 ml. sterile broth plus 30 mg. Divergan (injected immediately). | V 0<br>L 0<br>R 0 |  |
|  | V 0<br>L 0<br>R 0 |  |
| 1 ml. sterile broth plus 30 mg. Malethamer (injected immediately). | V 1<br>L 1<br>R 2 | Peritonitis: 1. |
| 1 ml. sterile broth plus 30 mg. Gantrez (injected immediately). | V 3<br>L 3<br>R 3 | Peritonitis: 3. |

TABLE XI

| Dosage | Results of tests | Observations |
|---|---|---|
| Controls—1 ml. culture | V 3<br>L 3<br>R 1 | Peritonitis: 3, death at hour 20. |
|  | V 2<br>L 2<br>R 2 | Peritonitis: 3, death at hour 21. |
|  | V 4<br>L 4<br>R 1 | Peritonitis: 3. |
|  | V 4<br>L 4<br>R 4 | Peritonitis: 4. |
| 1 ml. culture plus 30 mg. Divergen (1½ hour contact). | V between 0 and 1<br>L 0<br>R 0 | No peritonitis. |
|  | V 0<br>L 0<br>R 0 | No peritonitis. |
| 1 ml. culture plus 50 mg. Divergan plus 0.5 ml. water (1½ hour contact). | V 1<br>L 1<br>R 0 | No peritonitis. |
|  | V 1<br>L 1<br>R 0 | No peritonitis. |
| 1 ml. culture plus 30 mg. Malethamer (1½ hour contact). | V 2<br>L 2<br>R 0 | Peritonitis: 3, death at hour 18. |
| 1 ml. culture plus 50 mg. Malethamer plus 0.5 ml. water (1½ hour contact). | V 2<br>L 1<br>R (?) | Peritonitis: 3, death at hour 20. |
| 1 ml. culture plus 30 mg. Gantrez (1½ hour contact). | V 2<br>L 2<br>R 2 |  |
|  | V 4<br>L 4<br>R 2 | Peritonitis: 2, death at hour 19. |
| 1 ml. culture plus 50 mg. Gantrez plus 0.5 ml. water (1½ hour contact). | V 2<br>L 2<br>R 2 |  |

Table X shows that in the absence of a pathogenic culture "Divergan" has no irritative effect, while "Malethamer" and "Gantrez" cause an irritation of the intestinal wall.

Table XI shows that in the animals treated with "Divergan," no peritonitis was observed, while the animals treated with "Malethamer" and "Gantrez," suffered a severe peritonitis which, in one case for "Gantrez," and in all cases for "Malethamer," was fatal before the end of the experiment.

These tests demonstrate that under the conditions of the experiment, the effect of the polyamide utilized is far superior to that of the carboxylic resins of the prior art.

(12) Investigation on the adsorption of a Staphylococcic toxin α by "Grill-tex 1F" in a test on rabbits.

Used Products:

"Grill-tex 1F": described above.

"Nemolysin α" or staphylococci toxin.

Utilized in a sterile buffered physiological solution of the following composition:

|  | Gm. |
|---|---|
| $Na_2HPO_4$, 12 $H_2O$ | 11.678 |
| $KH_2PO_4$ | 6.315 |
| NaCl | 4.5 |

Distilled apyrogenic water added to 1,000 ml. at a pH of 6.5.

Results expressed in D-C-H (dose of hemolytic combinations, i.e., the smallest quantity of toxin which, combined with the antitoxic unit of a standard antistaphylococci serum is no longer capable of causing hemolysis). After a series of tests on rabbits of 3.200 kgm. to 3.500 kgm. of a new batch of toxin, it was determined that a fatal dose corresponds to 8 D-C-H.

Male rabbits "Blanc de Bouscat" from 3.200 kgm. to 3.500 kgm.

Experimental method:

Three rabbits were injected intravenously with one dose of toxin corresponding to 8 DCH.

Five rabbits were injected with the residual liquids from the adsorption of a 8 DCH by increasing doses of "Grill-tex."

The time of contact between "Grill-tex 1F" and staphylococci toxin α in a buffered solution was 4 hours. The following Table XII summarizes the obtained results:

TABLE XII

| Rabbit No. | Weights in kg. | Administered substances | Results |
|---|---|---|---|
| 1 | 3.550 | Staphylococci toxin corresponding to 8 DCH | Dies 45 min. after injection. |
| 2 | 3.450 | do | Dies 40 min. after injection. |
| 3 | 3.550 | do | Dies 42 min. after injection. |
| 4 | 3.550 | Staphylococci toxin α in buffered solution, corres. to 8 DCH in contact 4 hrs. with 50 mg. "Grill-tex." | Dies between 3rd and 15th hr. after injection. |
| 5 | 3.350 | Same as 4. In contact 4 hrs. with 100 mg. "Grill-tex." | Alive on 5th day. after injection. |
| 6 | 3.250 | Same as 4. In contact 4 hrs. with 200 mg. "Grill-tex." | Do. |
| 7 | 3.200 | Same as 4. In contact 4 hrs. with 300 mg. "Grill-tex." | Do. |
| 8 | 3.500 | Same as 4. In contact 4 hrs. with 500 mg. "Grill-tex." | Do. |

Table XII shows that "Grill-tex 1F" adsorbs well the staphylococci toxin α.

(13) Clinical tests

The poly-ε-caproamide studied was administered to different patients, suffering from intestinal aliments, at doses of 1 to 3 sachets (as prepared in Example I, first preparation), containing 2 gm. of active principle, per day. The results are summarized in Table XIII.

TABLE XIII

| Patient | Diagnosis | Dosology per day | Results | Tolerance |
|---|---|---|---|---|
| 1 | Staphylococci infection, treatment with stapnylomycin, problems of transit, diarrhea, tenesmus. | 2 sachets | Rapid improvement in 48 hours, allowing the continuation of the treatment by staphylomycin. | Good. |
| 2 | Alimentary toxic infection | do | Improvement of the distrubances in 48 hours | Do. |
| 3 | Diarrhea from Candida albicans | 2 sachets for 1 week. | Rapid improvement of the disturbances, disappearance of the Candida on coproculture. | Do. |
| 4 | Diarrhea from excessive use of laxatives in a colitic patient. | 2 sachets | Improvement of the disturbances in 48 hours | Do. |
| 5 | Diarrhea in a cirrhotic patient | do | Very favorable results | Do. |
| 6 | Prolonged diarrhea (non-bacillary) in a tubercular patient, probable medicinal origin. | do | Cessation of the diarrhea under treatment | Do. |
| 7 | Alimentary toxic infection | 3 sachets | Cessation of the disturbances in 48 hours | Do. |
| 8 | Diarrhea in a colitic patient following a change of diet. | 1 sachet | Cessation of the disturbances in 3 days | Do. |
| 9 | Diarrhea from Candida albicans, after antibiotic treatment. | 2 sachets | Very good results, regulation of the transit in 3 days. | Do. |
| 10 | Diarrhea from Candida albicans | do | Very satisfactory results; rapid disappearance of the Candida on coproculture. | Do. |
| 11 | Cirrhosis of the liver, loss of appetite, diarrhea | do | Improvement of the transit | Do. |
| 12 | Diarrhea in an alcoholic patient; precirrhotic state. | do | Rapid improvement, disappearance of the diarrhea. | Do. |
| 13 | Diarrhea caused by antibiotic treatment (tetracycline). | do | Progressive improvement of the disturbances, reestablishment of normal transit within a few days. | Do. |
| 14 | Alimentary toxic infection | 3 sachets | Very rapid improvement, reestablishment of normal transit in 48 hours. | Do. |
| 15 | Change of diet in an ancient colitic patient | 2 sachets | Good results, rapid sedation of the colic pains and cessation of the diarrhea. | Do. |
| 16 | Spasmodic colitis of the left side; alternating constipation and diarrhea. | do | Reestablishment of a more normal transit; sedation of the pains. | Do. |
| 17 | Common alimentary toxic infection | do | Improvement of the disturbances in 48 hours | Do. |

From these results, it could be ascertained that the improvement in the disturbances: decrease of the frequency of evacuations and of colic pains, generally occurred within two days. The transit became normal and the colic pains disappeared in a parallel degree.

It should also be stressed here that the three cases of diarrhea caused by *Candida albicans* showed a remarkable improvement with the disappearance of Candida on coproculture.

The alimentary toxic infections and the diarrheas caused by change in diet or excessive use of laxatives in colitic patients were both favorably influenced by the administration of the studied product.

The two cases of diarrhea caused by antibiotics showed a rapid improvement.

Lastly, the perfect tolerance of the product, which, administered at an average daily dose of 2 sachets containing 2 gm. of active principle, never caused secondary disturbances, should be emphasized.

Determination of acute toxicity

Poly-$\epsilon$-caproamide was administered orally, as suspension in a gum arabic solution, to groups of mice of the Rockland species, each animal weighing 18 to 22 gm.

The animals were kept under observation for one week. Up to the considerable dose of 5 gm./kg., no mortality was noted.

Determination of subacute toxicity

This test of the subacute toxicity was conducted on groups of male rats, each animal weighing about 170 gm. Poly-$\epsilon$-caproamide was utilized as a suspension in a gum arabic solution and administered daily through an esophagus sound over a period of 21 days at doses of 135 mg./kg., 335 mg./kg. and 665 mg./kg. The animals serving as controls received only the gum arabic solution.

The weight of each animal was recorded each day. At the end of the test, hematological examinations were effected on three rats for each dose. The blood count, leucocyte distribution and the amount of hemoglobin were determined.

No significant change in comparison with the untreated rats was noted.

It can be ascertained that at the doses administered, poly-$\epsilon$-caproamide did not affect the weight increase of the rats nor did the product interfere with the function of the hemopoietic and leuco-formative organs.

This test of subacute toxicity was conducted on three groups of six male white rats per group, each animal weighing an average of 70 gm. "Grill-tex 1F" was administered daily through an esophagus sound in an aqueous suspension either once or twice daily over a period of 15 days at a rate of 25 mg. per administration.

During the first three days the animals which received 50 mg. daily (2×25 mg.) evidenced a lack of appetite and had very hard stools. The other rats showed no abnormalities. After 15 days of administering, the two series which received "Grill-tex" showed a good general condition compared with the controls. The animals were held under observation after the 15 days and all showed normal general development. Their appetite, behavior and stools were normal. The product is well tolerated by young rats.

The preceding specific embodiments are illustrative of the practice of the invention. It is to be understood, however, that other expedients known to those skilled in the art can be employed without departing from the spirit of the invention or the scope of the appended claims.

We claim:

1. A method for controlling acute or chronic diarrhea in warm-blooded animals which comprises orally administering to warm-blooded animals suffering from diarrhea a therapeutically effective amount of from 10 mg./kg. to 100 mg./kg. daily of a pulverulent, pharmaceutical-grade polyamide having an average molecular weight of from 10,000 to 50,000 selected from the group consisting of nylon 6, nylon 66, nylon 610, nylon 11 and the terpolymer of about 1 mol of hexamethylenediamine, about 1 mol of adipic acid and from 0.5 to 2 mols of 12-aminododecanoic acid.

2. The method of claim 1 wherein said polyamide is nylon 6 having an average molecular weight of from 10,000 to 20,000.

3. The method of claim 1 wherein said polyamide is nylon 66.

4. The method of claim 1 wherein said polyamide is nylon 610 having an average molecular weight of from 15,000 to 50,000.

5. The method of claim 1 wherein said polyamide is nylon 11 having an average molecular weight of from 15,000 to 30,000.

6. The method of claim 1 wherein said polyamide is a terpolymer of about 1 mol of hexamethylenediamine, about 1 mol of adipic acid and from 0.5 to 2 mols of 12-aminododecanoic acid.

References Cited

UNITED STATES PATENTS

| | | | |
|---|---|---|---|
| 3,202,577 | 8/1965 | Markus | 424—78 X |
| 3,297,664 | 1/1967 | Miskel et al. | 424—34 X |
| 3,308,028 | 3/1967 | de Vries | 424—94 |
| 3,515,702 | 6/1970 | Raabe | 260—78 L |

OTHER REFERENCES

Floyd, Polyamide Resins, 2nd ed., received at U.S. Patent Office May 23, 1966, pp. 3, 4, 12, 13, 24, 60 and 18.

ALBERT T. MEYERS, Primary Examiner

A. J. ROBINSON, Assistant Examiner